Figure 1:
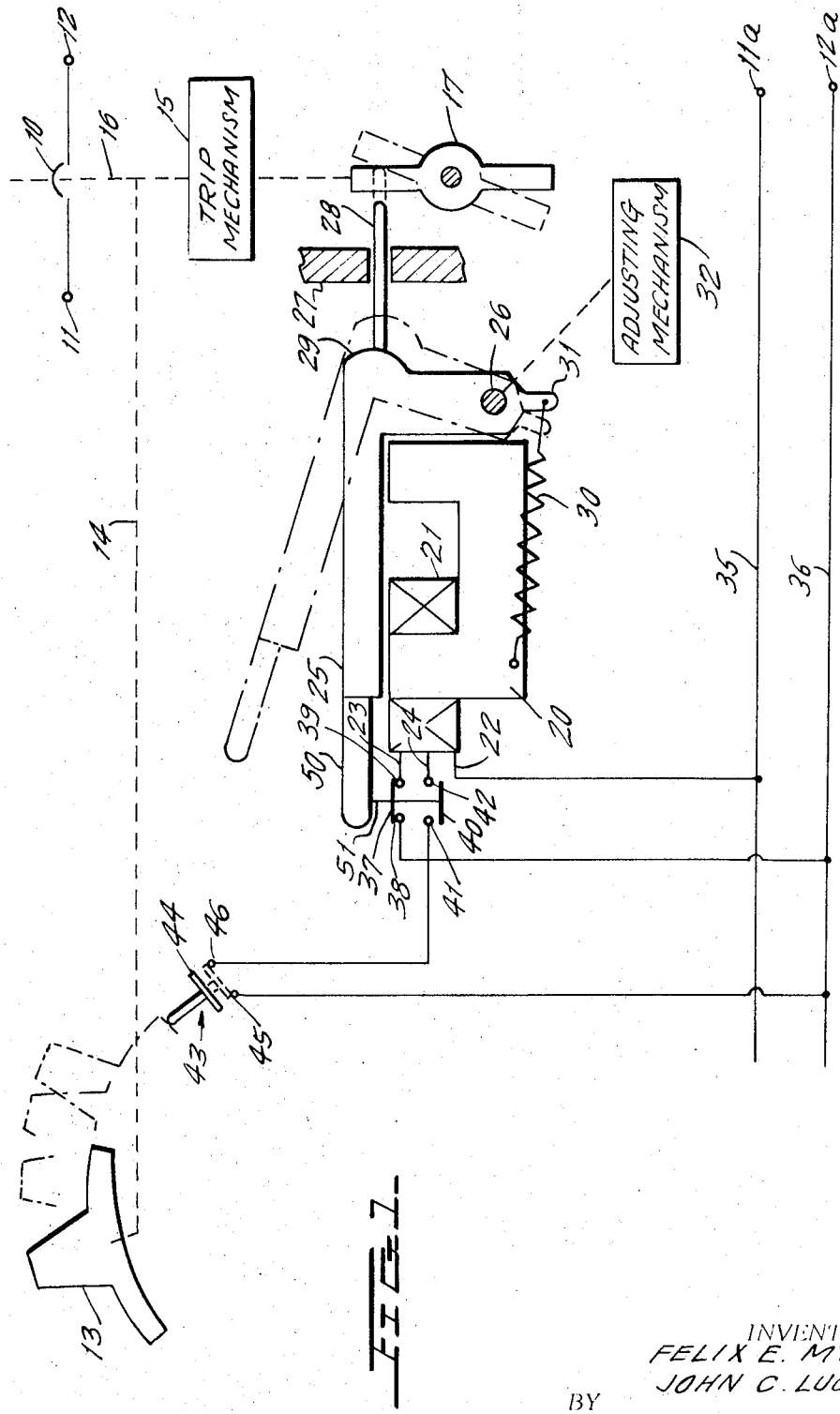

United States Patent

[11] 3,562,589

| [72] | Inventors | Felix Myers;<br>John C. Lucas, Cherry Hill, N.J. |
|---|---|---|
| [21] | Appl. No | 758,498 |
| [22] | Filed | Sept. 9, 1968 |
| [45] | Patented | Feb. 9, 1971 |
| [73] | Assignee | I-T-E Imperial Corporation<br>Philadelphia, Pa.<br>a corporation of Delaware |

[54] ELECTRICALLY RESETTING UNDERVOLTAGE TRIP FOR CIRCUIT BREAKERS
10 Claims, 4 Drawing Figs.

[52] U.S. Cl. .................................................. 317/31, 317/154
[51] Int. Cl. ...................................................... H01h 3/24
[50] Field of Search.......................................... 317/31, 54, 154; 307/130, 143; 335/20, 174

[56] References Cited
UNITED STATES PATENTS

| 1,973,804 | 9/1934 | Frese............................ | 307/143 |
| 3,382,374 | 5/1968 | Campbell..................... | 307/130 |
| 3,395,372 | 7/1968 | Opad............................ | 335/174 |

Primary Examiner—Harold Broome
Attorney—Ostrolenk, Faber, Gerb & Soffen

ABSTRACT: An undervoltage trip structure for circuit breakers which has an electrical closing coil which moves an armature which in turn operates the trip mechanism of the circuit breaker. The undervoltage coil is then connected in a circuit so that, when the circuit voltage is appropriate, a first portion of the closing coil will operate the armature to permit the tripping mechanism of the circuit breaker to be relatched, whereby the circuit breaker can be closed. After relatching of the trip mechanism, a second circuit is closed connecting the full closing coil in series with the circuit voltage, whereby if an undervoltage or zero voltage exists in the circuit, the armature will be released and the trip mechanism operated before the circuit breaker main contacts have an opportunity to reclose.

INVENTORS
FELIX E. MYERS
JOHN C. LUCAS
BY
Ostrolenk, Faber, Gerb & Soffen
ATTORNEYS INVENTORS
FELIX E. MYERS
JOHN C. LUCAS
BY
OSTROLENK, FABER, GERB & SOFFEN
ATTORNEYS

ELECTRICALLY RESETTING UNDERVOLTAGE TRIP FOR CIRCUIT BREAKERS

This invention relates to circuit breaker devices, and more particularly relates to a novel undervoltage control mechanism for circuit breakers.

Undervoltage relays and undervoltage trip mechanisms are well known for use in circuit breakers whereby the circuit breaker will trip responsive to an undervoltage or zero voltage in the circuit being protected. In one type of undervoltage trip device, a magnetic armature is provided which cooperates with the circuit breaker tripping mechanism. The undervoltage armature is normally held in an inoperative position by means of a winding which is energized from the voltage of the circuit being protected. When this voltage decreases below some specified value or decreases to zero, the magnetic armature is released and mechanically acts upon the circuit breaker trip mechanism to automatically open the circuit breaker. A mechanical reset means is then provided for moving the magnetic armature back to its inoperative position and the trip mechanism can be reset or relatched so that the circuit breaker can be reclosed. If the line voltage is still below the specified value or at zero when the circuit breaker is reclosed, the undervoltage mechanism will again operate and trip the circuit breaker a second time.

With this type arrangement, however, the circuit breaker contacts have closed, if only momentarily, so that the undervoltage condition on the line can damage the equipment being protected by the circuit breaker.

The present invention provides a novel undervoltage trip device which operates the circuit breaker trip mechanism in the usual manner responsive to an undervoltage condition, but further operates to prevent the relatching or resetting of the trip mechanism until the undervoltage condition has been removed. Thus, it is not possible, with the device of the present invention, to reclose the circuit breaker or to permit the contacts thereof to retouch even momentarily if the undervoltage condition causing the operation of the circuit breaker still remains.

In accordance with the present invention, a magnetic armature which is movable from an inoperative position to a position in which it unlatches the trip mechanism of a circuit breaker is controlled by a winding energized from the circuit being protected. The winding is energized through a first pair of contacts and supplies a sufficient magnetomotive force to hold the armature in its inoperative position against the biasing force of an undervoltage calibrating spring. Therefore, when the voltage of the circuit being protected decreases below the given value, as determined by the calibration of the mechanism, the armature will be released and the circuit breaker will be opened.

In order to move the armature back to its inoperative position, a second circuit is provided which connects a portion of the same winding in series with the line voltage and in series with a pair of contacts which are closed responsive to the movement of the manual operating handle or mechanism to a relatch or reset position. A relatively high current will flow through this winding portion because of its relatively low resistance in that sufficient ampere turns are generated to cause the armature to move back toward its inoperative position with relation to the trip mechanism. At the same time, the circuit connecting the partial winding portion is disconnected, and the full winding (and its high resistance) associated with the normal undervoltage trip operation is reconnected. Therefore, if the undervoltage situation still exists in the circuit being protected, the magnetic armature will again be released, defeating the relatching of the trip mechanism and preventing the possible reclosing of the circuit breaker, if only momentarily. The closing coil is so designed that it will be strong enough to close the armature at a value slightly above the drop out voltage when used as a holding coil. This will prevent possible relatching of the breaker which would result in chattering if the operator held the circuit breaker reset means in the reset position.

Accordingly, a primary object of this invention is to provide a novel electrical means for closing an undervoltage armature.

Still another object of this invention is to provide an electrical lockout for circuit breakers having undervoltage protection devices.

Yet another object of this invention is to prevent the relatching of a circuit breaker equipped with an undervoltage device under undervoltage conditions or no-voltage conditions.

These and other objects of this invention will become apparent when taken in connection with the following description of the drawings in which:

FIG. 1 is a circuit diagram which schematically illustrates the novel mechanism and circuit of the present invention.

Figure 2:
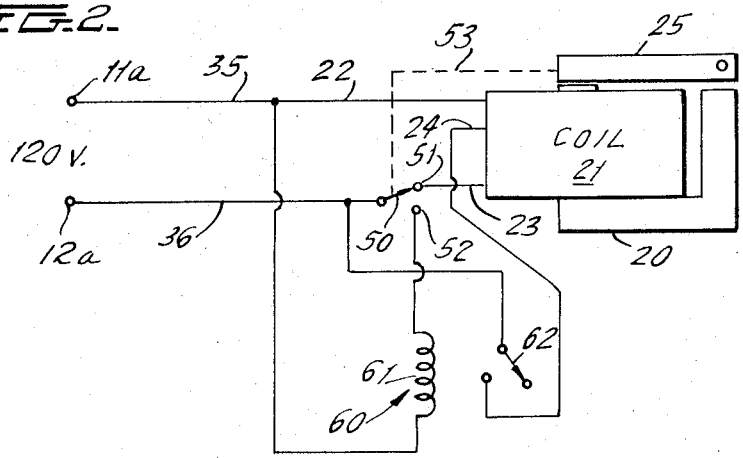

FIG. 2 schematically illustrates a modification of the circuit of FIG. 1 in which the reset function is made independent of the reset mechanism of a circuit breaker.

Figure 3:
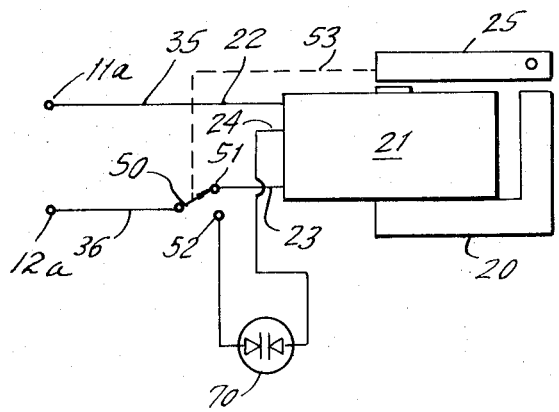

FIG. 3 schematically illustrates a modification of FIG. 2 in which the reset relay is replaced by a semiconductor switching device.

Figure 4:
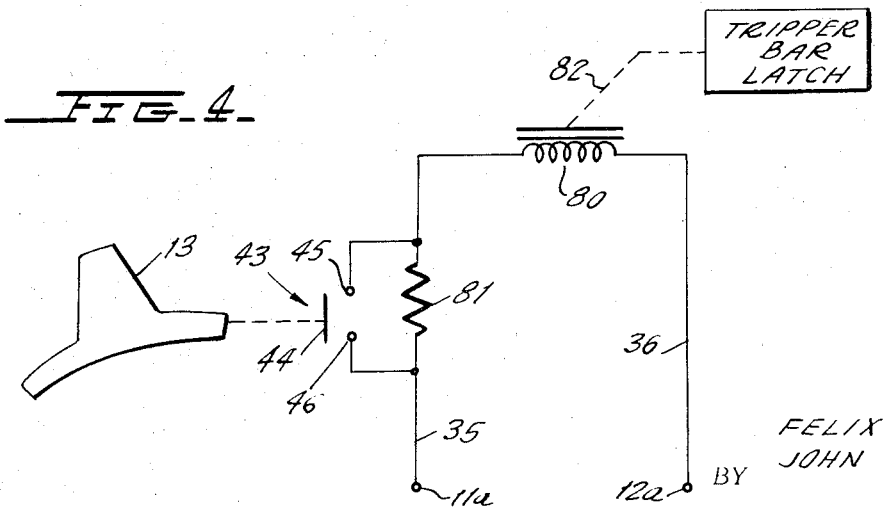

FIG. 4 shows a still further embodiment of the invention which uses an untapped operating winding.

Referring first to FIG. 1, there is schematically illustrated a circuit breaker 10 connected in a circuit having terminals 11 and 12. The circuit breaker 10 contains an operating handle 13 movable between the dotted line tripped, off and relatched positions with the handle in the solid line position when the circuit breaker is on or closed.

The operating handle 13 is mechanically connected to the circuit breaker contacts as indicated by dotted line 14, and is further connected to a trip mechanism 15 which, in turn, is connected to the circuit breaker contacts by the dotted line 16. Thus, the contacts of circuit breaker 10 can be operated either from the circuit breaker handle 13 or the trip mechanism 15.

The trip mechanism 15 includes a standard pivotally mounted tripper bar 17 which is movable from the solid line relatch position to the dotted line trip position. It will be readily understood by those skilled in the art that movement of circuit breaker handle 13 to its relatch position will permit trip mechanism 15 to retain tripper bar 17 in its relatch position.

Circuit breakers incorporating this type equipment are so well known in the art that no further description thereof would be necessary to one skilled in the art.

It will also be readily apparent to those skilled in the art that the contacts of circuit breaker 10 are manually movable between an open and closed position by movement of circuit breaker handle 13 between the labeled ON and OFF positions. The circuit breaker 10 may also be automatically operated by means of the trip mechanism 15 in the conventional manner, whereby the contacts will be automatically opened and the operating handle moved to the labeled TRIPPED position responsive to some fault which removes the latch of trip mechanism 15 so that tripper bar 17 rotates from its solid line position to the dotted line position.

In order to reclose the circuit breaker under this condition, it is necessary to move the circuit breaker handle 13 from the tripped position to the relatch position, thereby rotating tripper bar 17 from the tripped position to the relatch position and permitting movement of the circuit breaker handle back to the ON position in order to reclose the circuit breaker.

The drawing schematically illustrates the undervoltage trip mechanism of the present invention and the manner in which it operates in relation to tripper bar 17. Thus, the undervoltage trip mechanism of the invention includes a stationary magnet 20 having a winding 21 thereon. Winding 21 has a lower end 22 and an upper end 23 with a tap 24. A magnetic armature 25 is then provided for magnet 20 and is pivotally mounted on pivot point 26 so as to be movable from the solid line and inoperative position to the dotted line position which causes the operation of trip mechanism 15. More specifically, a support wall 27 carries a slidable pin 28 which bears against shoulder 29 of armature 25. The right-hand end of pin 28 is aligned with tripper bar 17 such that rotation of armature 25 to the dotted line position will cause movement of pin 28 to the right, thereby rotating tripper bar 17 clockwise in order to remove the trip mechanism latch to permit automatic opening of the circuit breaker contacts.

Magnetic armature 25 is normally biased in a clockwise direction by means of calibration spring 30 having one end fixed to magnet 20 and the other end fixed to projection 31 below pivot 26 on armature 25. Any suitable adjustment mechanism may be provided for spring 30 and for the position of pivot 26, schematically illustrated by adjusting mechanism 32 which adjusts the biasing force for rotating armature 25.

The movement of armature 25 will, of course, be controlled by the energization of coil 21. Coil 21 is then energized by the voltage between lines 35 and 36 which could be the circuit being protected by circuit breaker 10 and having terminals 11a and 12a.

Terminal 22 of coil 21 is then connected to line 35, while terminal 23 is connected to line 36 through movable contact 37 which cooperates with spaced contacts 38 and 39. A second circuit is then provided for terminal 24 which includes contact 40 which cooperates with fixed contacts 41 and 42 and a relatch momentary closing switch 43 having a movable contact 44 and stationary contacts 45 and 46. Projection 50 of armature 25 then carries a link, schematically shown as link 51, which is connected to contacts 37 and 40 such that contact 37 opens and contact 40 closes when armature 25 rotates clockwise. Movable contact 44 of relatch contact 43 is then suitably mechanically connected to the circuit breaker handle 13 so that contact 44 is closed when the circuit breaker operating handle 13 is moved to the relatch position. Clearly, the switch structure 43 could be a separate manually operated pushbutton or undervoltage relay used to initiate the resetting operation.

Coil 21 is designed to keep the heat generated at a minimum in order to prevent wire insulation breakdown. When the full coil is in the circuit, the coil resistance is relatively high so that the wattage I2R is relatively low. In order to close the armature 25, only the coil portion from terminal 22 to terminal 24 is used so there is less resistance and higher current. The current in the latter situation will provide sufficient ampere turns to close armature 25.

The operation of the system is as follows:

Under normal operating conditions, the various components will be in their solid line positions with the circuit breaker closed, and contact 37 will be closed. In the event of an undervoltage on lines 35 and 36, the force of attraction between magnet 20 and armature 25 will decrease to below the force of spring 30, whereupon armature 25 will rotate to the dotted line position. This will cause movement of pin 28 to the right, and the rotation of tripper bar 17, thereby defeating the trip mechanism latch and permitting the trip mechanism to automatically open circuit breaker contact 10 in the usual manner. Note that contact 37 opens and contact 40 closes in this operation. However, since switch 43 is open, the solenoid 21 is not reenergized.

In order to reclose the circuit breaker, and as pointed out previously, it is necessary to first relatch the trip mechanism by moving operating handle 13 to the relatch position. This will cause contact 44 to engage contacts 45 and 46, thereby completing a circuit from line 36 through contact 44 and through contact 40, which is closed, to terminal 24 of solenoid coil 21 to terminal 22 of solenoid coil 21 and back to line 35.

Assuming that the line voltage condition on lines 35 and 36 have returned to normal, the winding 21 between terminal 22 and 24 will be energized so that a relatively high current flows in this winding portion, thereby to attract armature 25 and move it to its solid line inoperative position, thus permitting rotation of tripper bar 17 to its relatch position and the relatching of the trip mechanism 15. The circuit breaker may now be moved to its ON position by the operating handle 13.

If no-voltage or very low voltage appears between lines 35 and 36, it will be apparent that solenoid winding 21 cannot be sufficiently energized to attract armature 25 so that tripper bar 17 cannot rotate to its solid line position to be relatched by the trip mechanism. Thus, the circuit breaker cannot be relatched and reclosed under the very low voltage conditions mentioned.

If, however, there is still an undervoltage condition on the line, but sufficient ampere-turns are generated in winding 21 to attract armature 25 to its inoperative solid line position, immediately after relatching, contact 37 will be closed so that the full winding 21 and the relatively high resistance thereof will be in the circuit. This will then permit immediate release of armature 25 and tripping of the trip mechanism to prevent closing of the breaker upon movement of handle 13 to the ON position.

Thus it is not possible for the operator to cause the contacts to be reclosed, even momentarily, if either an undervoltage condition still exists on the line or exists on the line when an attempt is made to close the circuit breaker, or if there is zero voltage on the line.

Note that coil 21 is so designed that its winding portion from terminals 22 to 24 will provide a number of ampere turns when the voltage of lines 35 and 36 is normal to close armature 25, which is slightly above the ampere turns provided by the full winding at the calibrated drop out voltage of lines 35 and 36. Therefore, if the operator held switch 43 closed, and an undervoltage condition existed, armature 25 would not be closed and armature "chatter" is avoided.

Referring next to FIG. 2, there is schematically illustrated therein portions of the arrangement shown in FIG. 1 where the reset function is made independent of the reset mechanism of a circuit breaker. Thus, FIG. 2 schematically illustrates the coil 21, armature 25, magnetic structure 20, with the coil 21 having terminals 22, 23 and 24 which are arranged in the manner previously described in FIG. 1. The electrical circuit, including lines 35 and 36, is also duplicated with their terminals 11a and 12a. The contact arrangement, including contacts 37 and 40 of FIG. 1, is shown in a simplified manner in FIG. 2 as the two-position switch 50 movable between fixed contacts 51 and 52. The dotted line 53 schematically illustrates the connection between armature 25 and movable contact 50, again, in the manner previously described in FIG. 1.

In accordance with the embodiment of FIG. 2, a relay 60, consisting of a relay winding 61 and relay contact 62, is provided in series with the closing coil portion including terminals 24 and 22 of coil 21. Relay winding 61 is then connected between contact 52 and line 35 so that it is connected across lines 35 and 36 when contact 50 engages contact 52, responsive to movement of armature 25 to the trip position. The operation of the circuit of FIG. 2 is such that it does not require the manual operation of a reset mechanism since contact 62 will not close until the voltage across lines 35 and 36 is above some given value to cause sufficient energization of coil 61. A satisfactory relay for relay 60, where the voltage between terminals 11a and 11b should be above about 120 volts before the undervoltage relay will move armature 25 to its inoperative position, is relay type KA5A6, manufactured by the Potter Brunfield Co. The closing of contact 62 will cause energization of the closing coil portion of coil 21 to close armature 25. This closes contact 50 to contact 51, so that armature 25 will be held in the closed position by the decreased current established through the full coil from terminals 22 to 23 by virtue of the closing of the contact 50 to contact 51.

FIG. 3 shows a modification of the circuit of FIG. 2 in which the relay 60 is replaced by a semiconductor switching device 70 such as any suitable four-layer switch or the like. In FIG. 3, when contact 50 engages contact 52, switching device 70 is connected in series with terminals 11a and 12a. Once the voltage across these terminals is at a suitable level, switching device 70 becomes conductive so that the closing portion of coil 21 is energized to move the armature 25 to its closed or inoperative position, thereby moving contact 50 to engagement with contact 51 and establishing a holding current through the full coil 21. This holding current will hold the armature 25 in its inoperative position until an undervoltage condition appears across the lines 35 and 36.

FIG. 4 shows a still further embodiment of the invention which may be used in connection with the reset switch 43 previously described in connection with FIG. 1. In FIG. 4, however, a closing winding 80 is provided which does not have a tap as in the prior embodiments, but is connected in series with resistor 81 and the pair of terminals 11a and 12a of lines 35 and 36, respectively. Note that FIG. 4 schematically illustrates winding 80 without showing the mechanical armature, and merely indicates the connection of a suitable armature to the tripper bar latch by the dotted line connection 82. The reset switch 43 then has its fixed contacts 45 and 46 connected across resistor 81, with these contacts being closed by the bridging contact 44 when the circuit breaker operating handle 13 is moved to a reset position.

In operation of the embodiment of FIG. 4, resistor 81 is normally connected in series with winding 80, with the current through the solenoid generating sufficient ampere turns to retain the armature associated with winding 80 in the inoperative position. If the voltage across lines 35 and 36 decrease below a given value, the ampere turns of winding 80 similarly decrease so that the tripper bar latch of the circuit breaker, or some other operating mechanism, is released.

In order to reclose this mechanism and when the arrangement is used in a circuit breaker, the movement of the circuit breaker handle 13 to the reset position short circuits resistor 81, so that a relatively high current can flow through winding 80 which will move the armature associated therewith to the inoperative position. When the circuit breaker handle 13 is then moved to an ON position, resistor 81 is returned to the circuit so that only holding current will flow through winding 80. Clearly, if this current is insufficient due to an undervoltage condition on lines 35 and 36 to hold the armature in the inoperative position, the circuit breaker cannot be reclosed. Alternatively, if the undervoltage tripper mechanism is not associated with a particular circuit breaker, the armature associated with winding 80 would be immediately released.

Although this invention has been described with respect to particular embodiments, it should be understood that many variations and modifications will now be obvious to those skilled in the art, and, therefore, the scope of this invention is limited not by the specific disclosure herein, but only by the appended claims.

We claim:

1. In combination, a circuit breaker and an undervoltage trip mechanism for said circuit breaker; said circuit breaker comprising an operative means movable between ON, OFF, and relatch positions, a pair of cooperating contacts movable between an engaged and a disengaged position, means connecting said pair of contacts to said operating means, a trip mechanism movable between a tripped position and a relatch position, means connecting said trip mechanism to said pair of contacts for automatically moving said pair of contacts from said engaged position to said disengaged position responsive to its movement to said tripped position, and means connecting said operating means to said trip mechanism for moving said trip mechanism from said tripped position to said relatched position responsive to movement of said operating means to its said relatch position; said undervoltage trip mechanism comprising a winding and a movable armature cooperating with said winding and movable between an inoperative position and a tripping position, means connecting said armature to said trip mechanism for moving said trip mechanism to its said tripped position when said armature moves to its said tripping position, means for biasing said armature to said tripping position, circuit means connecting said winding across an electrical circuit and relatch switch means connected in series with said circuit means; said winding holding said armature in said inoperative position against the force of said biasing means when the voltage across said electrical circuit exceeds a given value and said relatch switch means is closed, and releasing said armature when said voltage falls below said given value; and second switch means in parallel with said relatch switch means; said second switch means connected to said armature and being closed when said armature is in said inoperative position and being opened when said armature is in said tripping position.

2. The combination of claim 1 which further includes third switch means in series with said relatch switch means; said third switch means connected to said armature means and being open when said armature is in said tripping position and closed when said armature is in said inoperative position.

3. The combination of claim 1 wherein said second switch means is connected in series with said winding of said undervoltage trip mechanism.

4. The combination of claim 2 wherein said third switch means is connected to a tap of said winding means.

5. The combination of claim 1 wherein said relatch switch means is connected to said operating means and is closed when said operating means is moved to said relatch position.

6. The combination of claim 4 wherein said relatch switch means is connected to said operating means and is closed when said operating means is moved to said relatch position.

7. An undervoltage trip mechanism for a circuit breaker comprising in combination an electrical winding having a holding coil portion and a closing coil portion, a magnetic armature associated with said winding and movable between an inoperative position for closing said circuit breaker and a tripped position for opening said breaker, first switch means, second switch means, and reset switch means, each movable between a circuit open position and a circuit closed position, means for operating said reset switch means to said closed position to reset said circuit breaker after the opening thereof before said armature can move from said tripped position to said inoperative position to close said breaker, and an electrical circuit having a pair of terminals; said first and second switch means mechanically connected to said armature whereby said first and second switch means are respectively closed and open when said armature is in said inoperative position and are respectively open and closed when said armature is in said tripped position; said holding coil portion, said first switch means and said pair of terminals connected in series; said closing coil portion, said second switch means, said reset switch means, and said pair of terminals connected in series; said armature moved to and held in said inoperative position when the ampere turns in one of said closing coil and holding coil exceed a predetermined value; said armature being in said tripped position when said ampere turns are below said predetermined value, whereby said opened circuit breaker remains in its open position although sought to be reset until said ampere turns exceed said predetermined value.

8. The combination of claim 7 wherein said means for operating said reset switch consists of an undervoltage relay means connected to said pair of terminals.

9. The combination of claim 8 wherein said reset switch means consists of a semiconductor switch device; and wherein said means for operating said reset switch consists of circuit connections from said semiconductor device to said pair of terminals for causing said semiconductor device to conduct when the voltage across said pair of terminals exceeds a given value.

10. An undervoltage trip mechanism for a circuit breaker comprising a winding, a magnetic armature associated with said winding and movable between an inoperative position for closing said circuit breaker and a tripped position for opening said breaker, a resistor connected in series with said winding to change the current through said winding, momentary contact switch means connected in parallel with said resistor for connecting and disconnecting said resistor with respect to said winding, a circuit having a pair of terminals connected in series with said winding, and circuit breaker reset operating means connected to said momentary contact switch means to actuate said switch means and reset said circuit breaker after the opening thereof before said armature can move from each tripped position to said inoperative position to close said breaker, whereby operation of said reset operating means initially actuates said momentary contact switch means to a closed position to disconnect said resistor and increase the current through said winding to generate sufficient ampere turns to initially move said armature from said tripping position to said inoperative position and whereby the subsequent actuation of said momentary contact switch to an open position to connect said resistor decreases the current through said winding to generate decreased ampere turns although sufficient to hold said armature in said inoperative position to close said circuit breaker when the voltage between said pair of terminals exceeds a given value.